United States Patent [19]

Nomura et al.

[11] 4,248,372
[45] Feb. 3, 1981

[54] APPARATUS FOR AUTOMATICALLY WELDING CORRUGATED MEMBRANES

[75] Inventors: Hirokazu Nomura; Tadashi Fujioka, both of Tsu, Japan

[73] Assignee: Nippon Kokan Kabushiki Kaisha, Tokyo, Japan

[21] Appl. No.: 45,655

[22] Filed: Jun. 5, 1979

[30] Foreign Application Priority Data

Jun. 26, 1978 [JP] Japan ............................. 53-86765[U]

[51] Int. Cl.$^3$ ........................................... B23K 37/02
[52] U.S. Cl. ....................................... 228/32; 228/29; 219/124.31; 74/63
[58] Field of Search ....................... 228/25, 29, 32, 45; 219/124.31, 124.32, 124.33, 124.34, 125.1; 74/63, 422

[56] References Cited

U.S. PATENT DOCUMENTS

| 4,008,384 | 2/1977 | Cecil | 219/124.31 |
| 4,129,244 | 12/1978 | Morris | 228/32 X |

FOREIGN PATENT DOCUMENTS 111847 9/1977 Japan .

Primary Examiner—Kenneth J. Ramsey
Attorney, Agent, or Firm—Oblon, Fisher, Spivak, McClelland & Maier

[57] ABSTRACT

An apparatus for automatically welding corrugated membranes of a type in which a welding torch is mounted on a head attached to the welding apparatus proper by way of an arc gear segment and the arc gear segment is driven through a pinion gear, whereby the head is moved along the arc gear segment to control the position of the torch. The arc gear segment is driven for angular movement by a drive motor mounted in the welding apparatus proper, and the arc gear segment includes a pair of rotatable small wheels provided at the ends of the arc gear segment and a cord such as a chain or rope extended around the small wheels and along the arcuate teeth of the arc gear segment, the middle portion of the cord being securely attached to the head adapted to be movable along the arc gear segment, whereby when the arc gear segment is rotated, the head attached to the cord is simultaneously moved through an angle which is two times that of the arc gear segment.

4 Claims, 5 Drawing Figures

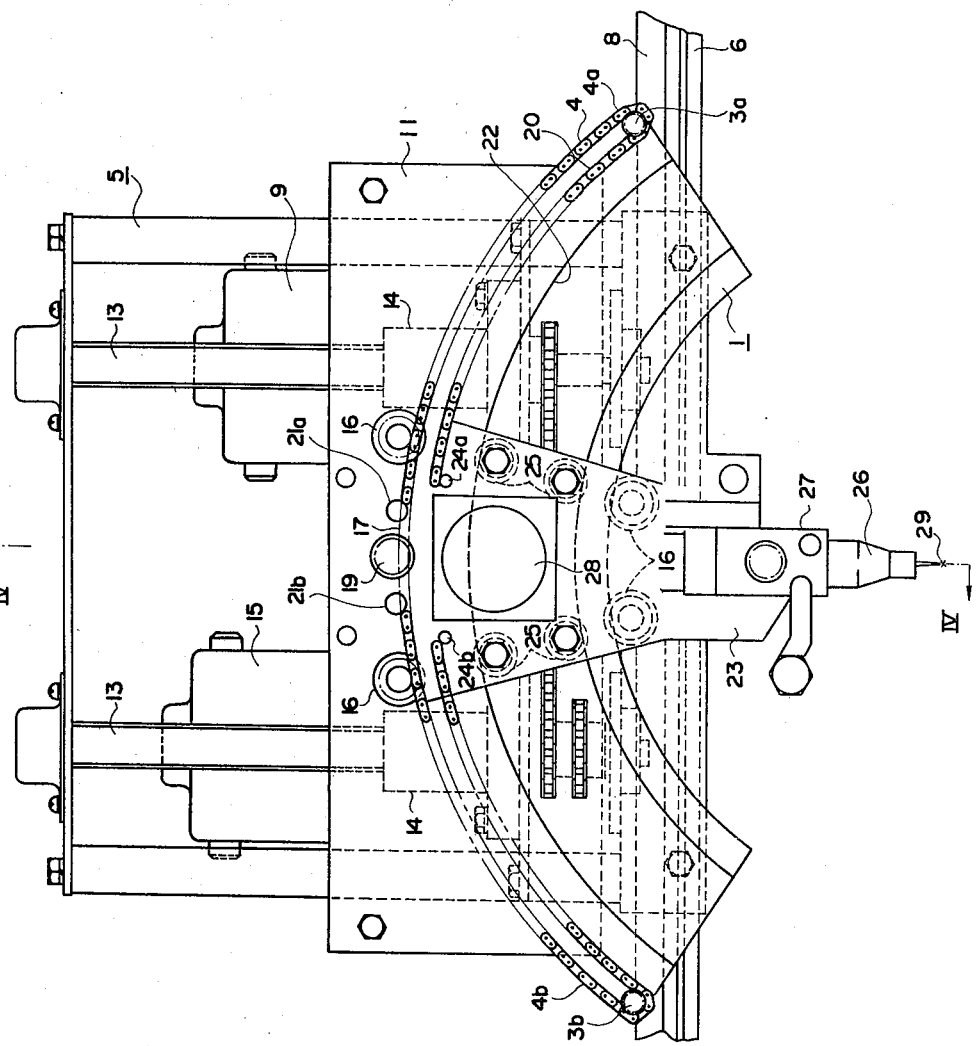

APPARATUS FOR AUTOMATICALLY WELDING CORRUGATED MEMBRANES

BACKGROUND OF THE INVENTION

The present invention relates to apparatus for automatically welding corrugated membrances, and more particularly the invention relates to improvements in and relating to the welding torch driving mechanism of such automatic welding apparatus.

In the lap welding of corrugated membranes which are used in the construction of an LNG tank or LNG vessel, the joining end of each membrane member has a configuration consisting of a series of straight-line and corrugated or curved portions and thus the automatic welding apparatus designed for welding such members is required to serve the dual functions of moving its torch along the welding line as well as in the vertical direction and rotating the torch about an axis which is perpendicular to the two directions. In other words, the welding of a lap fillet welding joint including the curved portions is accomplished by virtue of the resultant motion of the straight line movements in the two directions and the angular movement in the other direction of the torch at a predetermined welding speed and predetermined welding position. In this case, the angular movement of the torch is solely made when welding the curved portions and this angular movement maintains the torch in the same position relative to the joint as in the case of welding the straight-line portions.

With the welding of corrugated membranes, the straight lined portion of the membrane has a flat lower surface and its back surface involves no depressed space, with the result that the heat dissipation is excellent and there is no danger of the membrane being burnt through by the welding heat even if a relatively low welding speed is used. On the contrary, the curved portion of the membrane has a depressed space in its back surface, with the result that the welding heat will be built up in the membrane in correspondence with the volume of the space in the back surface and there is the danger of the membrane being burnt through by the welding heat if a relatively high welding speed is not used. In particular, the small-diameter arcuate portions on the sides and the top portion of the curved section each has a small radium of about 10 mm and consequently the torch must be driven at a high speed in order that the torch may be rotated while welding such a small diameter portion at a desired welding speed.

Known torch driving mechanisms used with the automatic welding apparatus of the above type are generally constructed so that usually an arc gear segment supported on the welding apparatus proper is rotated by a driving pinion gear mounted on the welding apparatus proper and a torch is attached to a head fixedly attached to the arc gear segment. In this case, the rotational speed of the torch is in direct correspondence with the rotational speed of the pinion gear and consequently the pinion gear must be driven at a high speed, thus giving rise to difficulties from the standpoint of rising and falling characteristics at the start and stop of the angular movement and thereby placing a limitation on the welding speed. On the other hand, disclosed in U.S. Pat. No. 4,008,384 is one in which one of a pair of arc gear segments is driven by a pinion gear on the welding apparatus proper to rotate the pair of arc gear segments as a unit and the other arc gear segment is engaged with a pinion mounted, along with a motor, on a torch head which is rotatably attached to the arc gear segments, whereby the two pinion gears are driven simultaneously to rotate a torch at a speed which is substantially two times that obtained with a single arc gear segment. However, this double arc gear type has the disadvantages of requiring an additional motor for the torch head and complicating the arrangements including the wiring of power supply cables to the torch, etc. Another disadvantage is that the head is increased in weight thus requiring an additional driving torque and that the overall weight is increased in the case of a portable type welding apparatus.

SUMMARY OF THE INVENTION

The present invention has been made in view of these deficiencies in the prior art, and in accordance with the present invention there is provided an apparatus for automatically welding corrugated membranes having a welding torch mounted on a head attached to the welding apparatus proper by way of an arc gear segment, whereby the arc gear segment is driven by way of a pinion gear so as to rotate the head along the arc gear segment and thereby to control the position of the torch. The arc gear segment is provided at each side end thereof with a small wheel such as a sprocket wheel which is freely rotatable in the same direction as the direction of movement of the arc gear segment and a cord consisting for example of a chain which is fixedly attached to the welding apparatus proper is extended around the small wheels to form a ring with the middle point of the cord being fixed to the torch head which is rotatable along the front part of the arc gear segment, whereby when the arc gear segment is moved by the driving of the pinion gear, the torch head fixed to the cord is simultaneously moved through an angle which is two times that of the arc gear segment. The arc gear segment is rotatably mounted on the front part of an elevating block which is vertically movably attached to the welding apparatus proper and including a drive motor and a pinion gear for moving the arc gear segment. An arcuate guide groove is formed in the front part of the arc gear segment to extend parallel to the pitch circle of the arcuate teeth and the cord is placed around the gear segment to extend through the arcuate guide groove and form a ring.

It is therefore a first object of the invention to provide an improved welding torch driving mechanism for an automatic welding apparatus of corrugated membranes in which an arc gear segment is moved angularly by a drive motor mounted in the welding apparatus proper whereby a torch head is moved through an angle which is two times that of the arc gear segment without using any other motor.

It is a second object of the invention to provide an automatic welding apparatus having a welding torch driving mechanism which is simple in construction and reduced in weight.

BRIEF DESCRIPTION OF THE DRAWINGS

FIG. 2 is a front view showing an embodiment of the invention.

DESCRIPTION OF THE PREFERRED EMBODIMENT

Figure 1A:
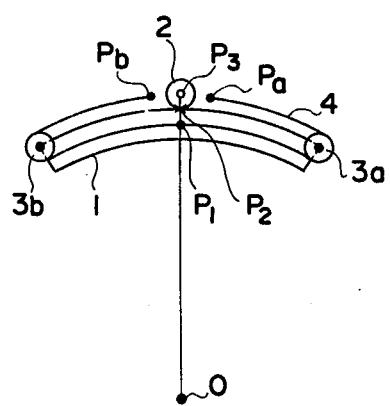
FIG. 1 shows the basic principle of a welding torch driving mechanism according to the invention, in which shown in (a) are the conditions prior to the operation and shown in (b) are the conditions after the operation.

Referring now to FIG. 1 showing the principle of a welding torch driving mechanism according to the invention, numeral 1 designates an arc gear segment having arcuate teeth formed in the upper surface thereof and engaged with a driving pinion 2 whereby the rotation of the pinion 2 causes the arc gear segment 1 to move about a point 0 as the center of rotation. Small wheels 3a and 3b such as sprocket wheels are provided on the side ends of the arc gear segment 1 so as to be rotatable in the same direction as the direction of movement of the segment 1, and a cord such as a chain is placed around the arc gear segment 1 to extend along the arcuate teeth pitch circle. The ends of the cord 4 are fixedly attached to the welding apparatus proper at points Pa and Pb. In the Figure, a point $P_1$ is the middle point of the cord 4, a point $P_2$ is the central point of the arc gear segment 1, a point $P_3$ is the center of rotation of the pinion 2, and a line $OP_1$ may be considered as the welding torch head.

Figure 1B:
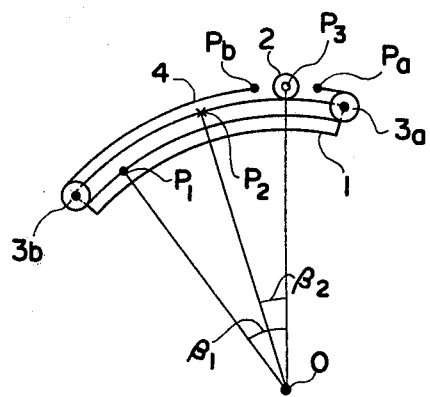

When the pinion 2 is rotated clockwise in the conditions shown in FIG. 1(a), the arc gear segment 1 is moved counterclockwise and the central point $P_2$ is moved through an angle $\beta_2$ as shown in FIG. 1(b). When this occurs, the cord 4 which is fixedly attached at the points Pa and Pb moves its middle point $P_1$ by an angle $\beta_1$ in the same direction as the segment 1 while rotating the small wheels 3a and 3b. It is evident that the angle $\beta_1$ is two times the angle $\beta_2$, and consequently if the arc gear segment 1 is moved a certain angle in one direction, the middle point $P_1$ of the cord 4 is moved in the same direction through an angle which is two times that angle with respect to the center 0. As a result, where the torch head is guided by the arc gear segment 1 so as to rotate the torch head about the center 0 serving as the center of rotation, if the torch head is fixedly attached to the middle point $P_1$, it is evident that when the arc gear segment 1 is moved through the angle $\beta_2$ by the pinion 2, the torch head is moved through the angle $\beta_1 = 2\beta_2$ and consequently the time required for moving the torch head through the angle $2\beta_2$ is one-half that required to move the arc gear segment 1 through the angle $2\beta_2$. In this case, the position at which the torch head is fixedly attached to the cord 4 or the middle point $P_1$ needs not to be limited to the geometrical central point of the cord 4, and it may be any place on the cord portion between the small wheels 3a and 3b which is not securedly attached (the portion which is nearer to the center 0 in FIG. 1). The selection is dependent on whether the neutral position of the arc gear segment 1 should become as shown in FIG. 1(a) when it is mounted on the welding apparatus proper. Thus, it is necessary to select the geometric central point of the cord 4 as its middle point $P_1$ only in cases where the torch head is to be moved an equal angle on both sides of the vertical line. Also the point of attachment of the torch head to the cord 4 needs not to be limited to the middle point $P_1$, and it is of course possible to fixedly attach the cord 4 to the torch head at two points on both sides of the middle point $P_1$, for example.

Figure 3:
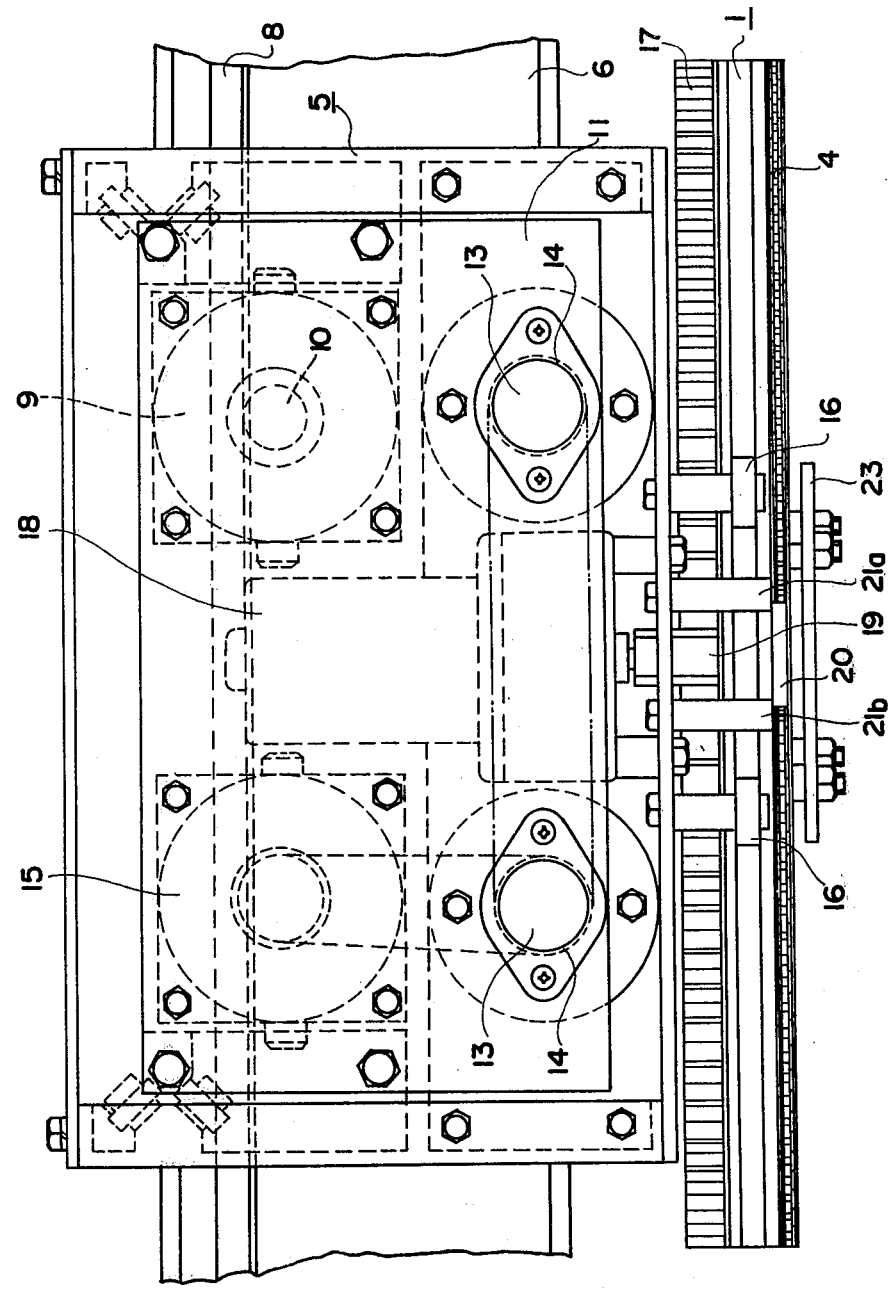
FIG. 3 is a plan view of FIG. 1.
Figure 4:
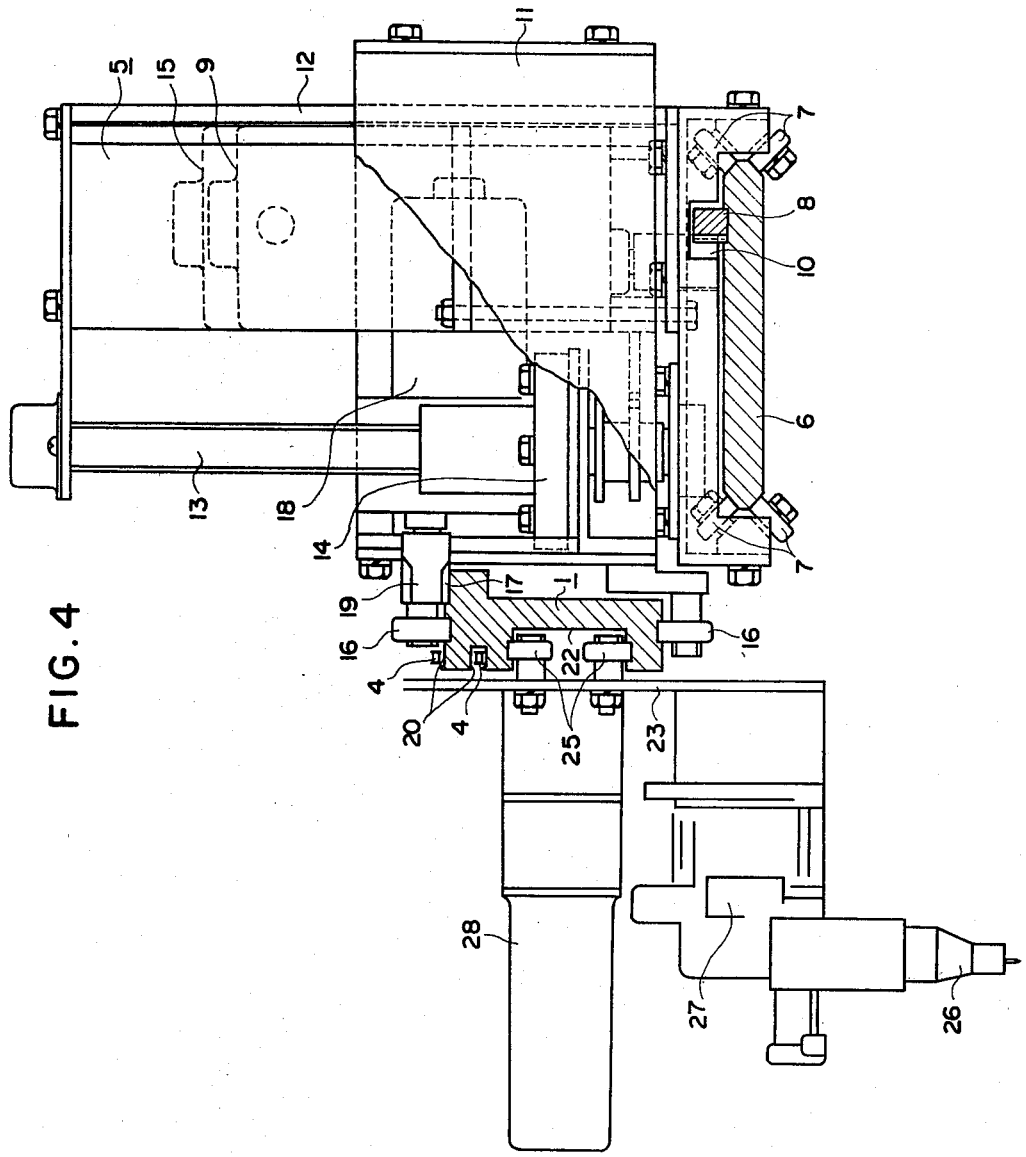
FIG. 4 is a view taken along and looked in the direction of the arrowed line IV—IV of FIG. 2.

FIGS. 2, 3 and 4 are respectively front and plan views of an embodiment of the apparatus for automatically welding corrugated membranes according to the invention and a sectional view taken along the line IV—IV of FIG. 2. In the Figures, numeral 5 designates the welding apparatus proper. The welding apparatus proper is mounted by guide wheels 7 on a guide rail 6 which is extended in the lengthwise direction of the lap joint of membranes to be welded, and a rack 8 mounted on the rail 6 to extend therealong is engaged with a pinion gear 10 which is driven by an X-axis motor 9 mounted in the welding apparatus proper 5 whereby the apparatus proper 5 is movable along the rail 6 through the operation of the motor 9. An elevating block 11 is mounted on the apparatus proper 5 so as to be guided along supporting posts 12, and the block 11 is vertically moved when female screws 14 fitted on pole screws 13 of the apparatus proper 5 are driven by an Y-axis motor 15 which is mounted in the block 11. An arc gear segment 1 is attached to the front part of the block 11 by means of a plurality of supporting rollers 16 so as to be rotated about the tip of a welding torch which will be described later, and engaged with arcuate teeth 17 in the upper surface of the arc gear segment 1 is a pinion gear 19 which is driven by a $\theta$-axis motor 18. An arcuate guide groove 20 is formed in the upper surface and the front part of the arc gear segment 1 and small wheels 3a and 3b each consisting of a sprocket wheel are provided at the side ends of the segment 1. Cords 4a and 4b each consisting of a chain are fitted in the guide groove 20 to extend around the small wheels 3a and 3b, and the cords 4a and 4b have their one ends respectively fixedly attached to fixed pins 21a and 21b which are vertically fitted in the front part of the block 11 on both sides of the pinion gear 19. Also fitted in an arcuate recess 22 in the front part of the arc gear segment 1 by means of supporting wheels 25 is a torch head 23 which is movable parallel to the pitch circle of the arcuate teeth 17, and the head 23 is fixedly attached to the middle portion of the cord 4 or the ends of the cords 4a and 4b at the positions designated by 24a and 24b in the Figure. Mounted on the torch head 23 are a TIG welding torch 26, an automatic arc length control block 27 and an arc length controlling motor 28. In the plan view of FIG. 3 the components 26, 27 and 28 are not shown. In FIG. 2 the lower end of the torch 26 which is designated at 29 is the center of rotation of the arc gear segment 1 and the torch head 23.

With the automatic welding apparatus of the invention, in the lap fillet welding of membranes the welding apparatus is moved in the horizontal direction along the welding line by moving the apparatus proper 5 along the rail 6 from the motor 9, and the block 11 is vertically moved through the operation of the Y-axis motor 15 so as to vertically move the torch 26 when welding the curved portions. On the other hand, in order to continuously maintain the torch 26 at a desired angle of orientation with respect to the curved portion the torch 26 is rotated by rotating the arc gear segment 1 from the $\theta$-axis motor 18. When the $\theta$-axis motor 18 is operated, the arc gear segment 1 is rotated a desired angle $\beta$ through the rotation of the pinion gear 19 and consequently the torch head 23 fixed to the cord 4 is rotated two times the desired angle $\beta$ or an angle of $2\beta$ in accordance with the principle of FIG. 1.

While, in the embodiment shown in FIGS. 2 to 4, the cord 4 consists of the two cords 4a and 4b for the purpose of reducing the cost by using short cords and the head 23 is fixedly attached to the middle portion of the cord 4 at the two points 24a and 24b, it is of course possible to use the cord consisting of a single element and in this case the middle portion of the cord is fixedly attached to the head at a single point.

It will thus be seen from the foregoing that in accordance with the invention, by virtue of the fact that only a single motor is used for rotating the torch and moreover the angle of rotation of the torch is doubled, not only the construction is simplified with the resulting reduction in weight, but also there is no need to use any additional motor which will cause troubles and there is also no need to use any high speed motor for ensuring the desired rotational speed, thus making the automatic welding apparatus of this invention extremely useful in practical applications.

We claim:

1. In an apparatus for automatically welding corrugated membranes including a welding torch mounted on a head attached to a welding apparatus proper by way of an arc gear segment and a pinion gear adapted to drive said arc gear segment so as to cause an angular movement of said head along said arc gear segment and thereby to control the position of said torch, the improvement wherein a rotatable small wheel is provided at each end of said arc gear segment, wherein a cord comprising a chain, wire or the like and fixedly attached at the ends thereof to said welding apparatus proper to form a ring, is extended around said small wheels and along arcuate teeth of said arc gear segment, and wherein a middle portion of said cord is fixedly attached to said head adapted to be movable along said arc gear segment.

2. An apparatus according to claim 1, wherein said arc gear segment is rotatably mounted on a front part of an elevating block vertically movably mounted on said welding apparatus proper, said elevating block including an arc gear segment driving motor and said pinion gear.

3. An apparatus according to claim 1, wherein said arc gear segment is formed in the front part thereof with an arcuate guide groove extending parallel to the pitch circle of said arcuate teeth, and wherein said cord is extended around said arc gear segment through said guide groove.

4. An apparatus according to claim 1, wherein said cord is divided into two cord portions at around the middle portion thereof, and wherein each of said cord portions is fixedly attached to said torch head at one end thereof.

* * * * *